United States Patent
Han et al.

(10) Patent No.: US 10,199,674 B2
(45) Date of Patent: Feb. 5, 2019

(54) SECONDARY BATTERY HAVING A CLAMPING DEVICE AND METHOD FOR MANUFACTURING SAME

(71) Applicant: LG CHEM, LTD., Seoul (KR)

(72) Inventors: Hyung Seok Han, Daejeon (KR); Sang Suk Jung, Daejeon (KR); Hyung Kyun Yu, Daejeon (KR); Ki Hoon Paeng, Daejeon (KR); Ji Hoon Lee, Daejeon (KR); Soo Ji Hwang, Daejeon (KR); Min Hyeong Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 141 days.

(21) Appl. No.: 15/298,974

(22) Filed: Oct. 20, 2016

(65) Prior Publication Data

US 2017/0133707 A1    May 11, 2017

(30) Foreign Application Priority Data

Nov. 9, 2015  (KR) .......................... 10-2015-0156774

(51) Int. Cl.
*H01M 4/00* (2006.01)
*H01M 10/04* (2006.01)
*H01M 2/02* (2006.01)

(52) U.S. Cl.
CPC ...... *H01M 10/0436* (2013.01); *H01M 2/0207* (2013.01); *H01M 10/04* (2013.01); *H01M 2220/30* (2013.01)

(58) Field of Classification Search
CPC .. H01M 10/0436; H01M 10/04; H01M 10/34; H01M 2/0207; H01M 2220/30
See application file for complete search history.

(56) References Cited

FOREIGN PATENT DOCUMENTS

| GB | 800734 | * | 9/1958 | ............. H01M 2/26 |
| KR | 10-0958649 B1 | | 5/2010 | |

* cited by examiner

*Primary Examiner* — Raymond Alejandro
(74) *Attorney, Agent, or Firm* — Birch, Stewart, Kolasch & Birch, LLP (57) ABSTRACT

A secondary battery includes a pouch case provided with an accommodation part accommodating an electrode assembly and a gas pocket part collecting a gas generated in the accommodation part by the electrode assembly, and a clamp device coupled between the accommodation part and the gas pocket part to seal a gap between the accommodation part and the gas pocket part.

8 Claims, 11 Drawing Sheets

SECONDARY BATTERY HAVING A CLAMPING DEVICE AND METHOD FOR MANUFACTURING SAME

CROSS-REFERENCE TO RELATED APPLICATIONS

The present application claims the benefit of the priority of Korean Patent Application No. 10-2015-0156774, filed on Nov. 9, 2015, which is hereby incorporated by reference in its entirety.

BACKGROUND OF THE INVENTION

Field of the Invention

The present invention relates to a secondary battery and a method for manufacturing the same, and more particularly, to a secondary battery that is improved in sealability between an electrode assembly accommodation part and a gas pocket part and a method for manufacturing the same.

Description of the Related Art

In general, secondary batteries refer to chargeable and dischargeable, unlike primary batteries that are not chargeable. The secondary batteries are being widely used in the high-tech electronic fields such as mobile phones, notebook computers, and camcorders.

SUMMARY OF THE INVENTION

The secondary battery according to the related art includes an electrode assembly and a pouch case in which the electrode assembly is accommodated. The pouch case includes an electrode assembly accommodation part in which the electrode assembly is accommodated, a gas pocket part collecting a gas generated in the electrode assembly accommodation part, and a sealing part connecting the electrode assembly accommodation part to the gas pocket part.

In the secondary battery according to the related art, since the gas pocket part is unnecessary when the gas is completely collected, the gas pocket part is cut and removed after sealing the sealing part.

However, in the secondary battery according to the related art, a portion of an electrolyte together with the gas generated in the electrode assembly accommodation part may be introduced into the gas pocket part through the sealing part. Here, the electrolyte contained in the gas passing through the sealing part may remain in the sealing part to deteriorate sealability of the sealing part, and thus, cause defects of products.

To solve the foregoing limitations, an aspect of the prevent invention provides a secondary battery, in which a clamp device is coupled to a sealing part connecting an electrode assembly accommodation part to a gas pocket part to seal the sealing part, and thereby to improve sealability between the electrode assembly accommodation part and the gas pocket part, and a method for manufacturing the same.

Another aspect of the present invention provides a secondary battery, in which a sealing part connecting an electrode assembly accommodation part to a gas pocket part is thermally fused to realize primary sealing, and a clamp device is coupled to the sealed sealing part to realize secondary sealing, and thereby to improve sealability between the electrode assembly accommodation part and the gas pocket part, and a method for manufacturing the same.

According to an aspect of the present invention, there is provided a secondary battery including: a pouch case provided with an accommodation part accommodating an electrode assembly and a gas pocket part collecting a gas generated in the accommodation part by the electrode assembly; and a clamp device coupled between the accommodation part and the gas pocket part to seal a gap between the accommodation part and the gas pocket part.

The clamp device may include a female member and a male member, which are respectively disposed on top and bottom surfaces between the accommodation part and the gas pocket part and coupled to each other to press the accommodation part and the gas pocket part and seal the gap between the accommodation part and the gas pocket part.

The female member may have a rounded shape with a C-shaped cross-section, and the male member may have a circular cross-section that is inserted into the female member.

The female member may have elasticity so that the male member is press-fitted to be surrounded by the female member.

The clamp device may have a length greater than that of the pouch case in a width direction.

A sealing part for sealing the gap between the accommodation part and the gas pocket part may be disposed between the accommodation part and the gas pocket part, and the clamp device may be coupled to the sealing part.

After the clamp device is coupled between the accommodation part and the gas pocket part, the gas pocket part connected to the clamp device may be cut and removed in a state in which a clearance surface remains.

The clearance surface may have a length ranging from about 10.0 mm to about 50.0 mm.

The clearance surface remaining on the clamp device may be coupled to a surface of the accommodation part.

According to another aspect of the present invention, there is provided a method for manufacturing a secondary battery, the method including: a preparing step (S10) of preparing a pouch case provided with an accommodation part in which an electrode assembly is accommodated and a gas pocket part collecting a gas generated in the accommodation part 121 by the electrode assembly; and a sealing step (S30) of coupling a clamp device between the accommodation part and the gas pocket part to seal a gap between the accommodation part and the gas pocket part.

In the sealing step (S30), the clamp device may include a female member and a male member, which are respectively disposed on top and bottom surfaces between the accommodation part and the gas pocket part and coupled to each other to press the accommodation part and the gas pocket part and seal the gap between the accommodation part and the gas pocket part.

After the sealing step (S30), the method may further include a removing step (S40) of cutting and removing the gas pocket part connected to the clamp device in a state in which a clearance surface remains.

The clearance surface may have a length ranging from about 10.0 mm to about 50.0 mm.

After the removing step (S40), the method may further include a coupling step (S50) of coupling the clearance surface to a surface of the accommodation part.

The method may further include a sealing step (S20) of sealing the gap between the accommodation part and the gas pocket part between the preparing step (S10) and the sealing step (S30).

BRIEF DESCRIPTION OF THE DRAWINGS

The above and other aspects, features and other advantages of the present invention will be more clearly understood from the following detailed description taken in conjunction with the accompanying drawings, in which:

FIGS. 7 to 11 are views illustrating a process of manufacturing the secondary battery according to the present invention.

DETAILED DESCRIPTION OF THE PREFERRED EMBODIMENT

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Figure 1:
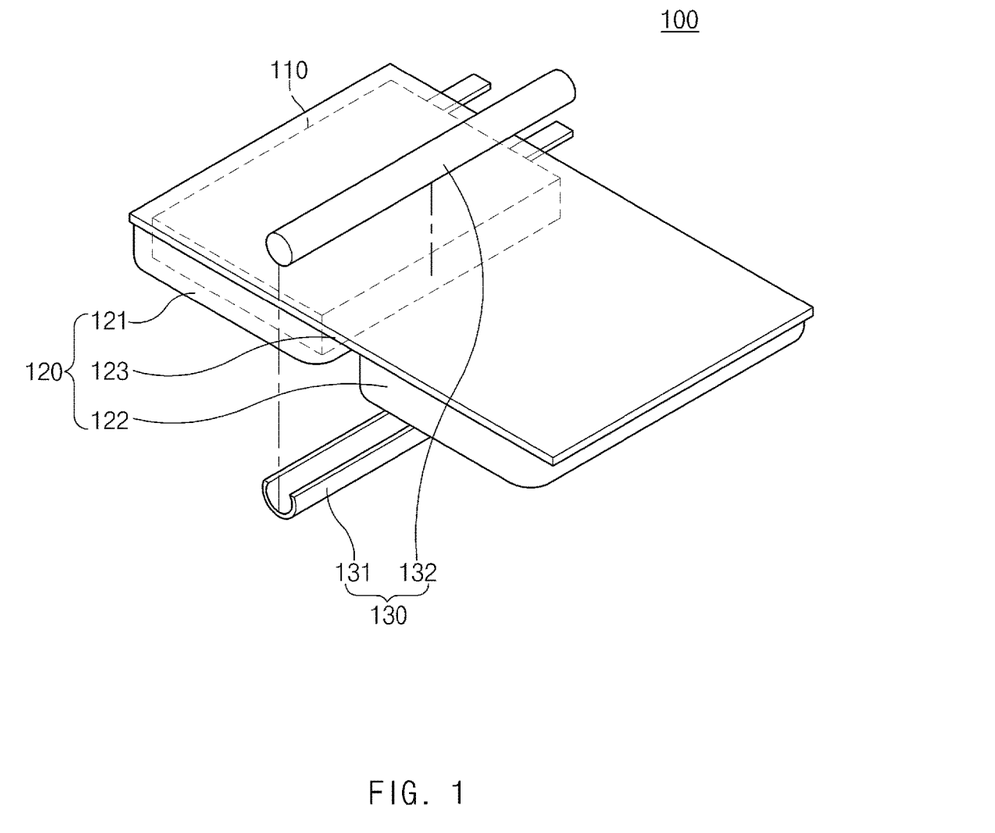
FIG. 1 is a perspective view of a secondary battery according to the present invention.
Figure 2:
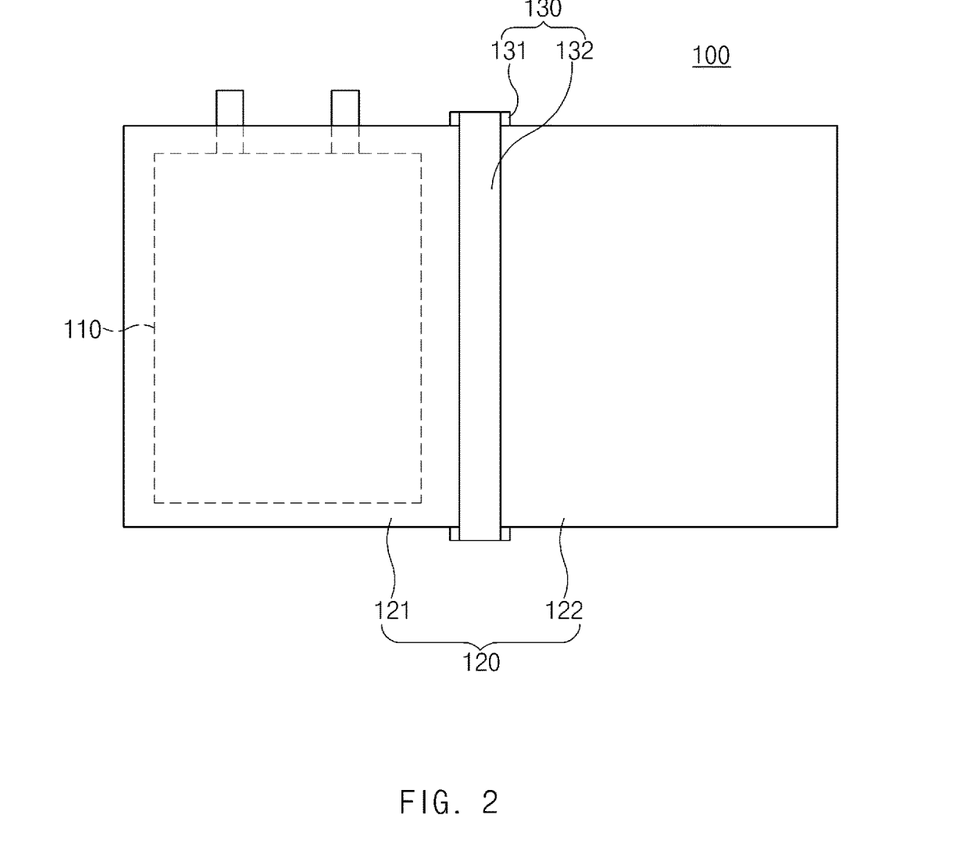
FIG. 2 is a plan view of the secondary battery according to the present invention.

As illustrated in FIGS. 1 and 2, a secondary battery 100 according to the present invention includes an electrode assembly 110 and a pouch case 120 in which the electrode assembly 110 is accommodated.

The electrode assembly 110 may be manufactured by alternately stacking a plurality of electrodes and a plurality of separators. Here, the plurality of electrodes are provided with a positive electrode and a negative electrode. Also, a positive electrode tab is disposed on the positive electrode, and a negative electrode tab is disposed on the negative electrode.

An electrolyte together with the electrode assembly 110 is accommodated in the pouch case 120. The pouch case 120 includes an accommodation part 121 in which the electrode assembly 110 and the electrolyte (not shown) are accommodated and a gas collection part 122 collecting a gas generated in the accommodation part 121. A sealing part 123 connecting the accommodation part 121 to the gas pocket part 122 is disposed between the accommodation part 121 and the gas pocket part 122.

The secondary battery 100 performs a charging/discharging process to improve performance. Here, when the electrode assembly 110 is charged and discharged, a gas is generated and then accumulated in the accommodation part 121 of the pouch case 120. The gas accumulated in the accommodation part 121 is collected into the gas pocket part 122 through the sealing part 123. When the gas is completely collected, the sealing part 123 between the accommodation part 121 and the gas pocket part 122 is sealed, and then, the gas pocket part 122 is cut and removed.

Here, the electrolyte is contained in the gas moving from the accommodation part 121 to the gas pocket part 122. A portion of the electrolyte contained in the gas may remain on an inner surface of the sealing part 123, and thus, the sealing part 123 may not be completely sealed. To prevent this phenomenon, although the sealing part 123 is excessively sealed at a high temperature to improve sealability, when the sealing part 123 is excessively sealed, an insulator may be damaged to cause an insulation defect.

To solve this limitation, in the secondary battery 100 according to the present invention, the sealing part 123 between the accommodation part 121 and the gas pocket part 122 may be coupled to a clamp device 130 to improve sealability and airtightness of the sealing part 123.

Figure 3:
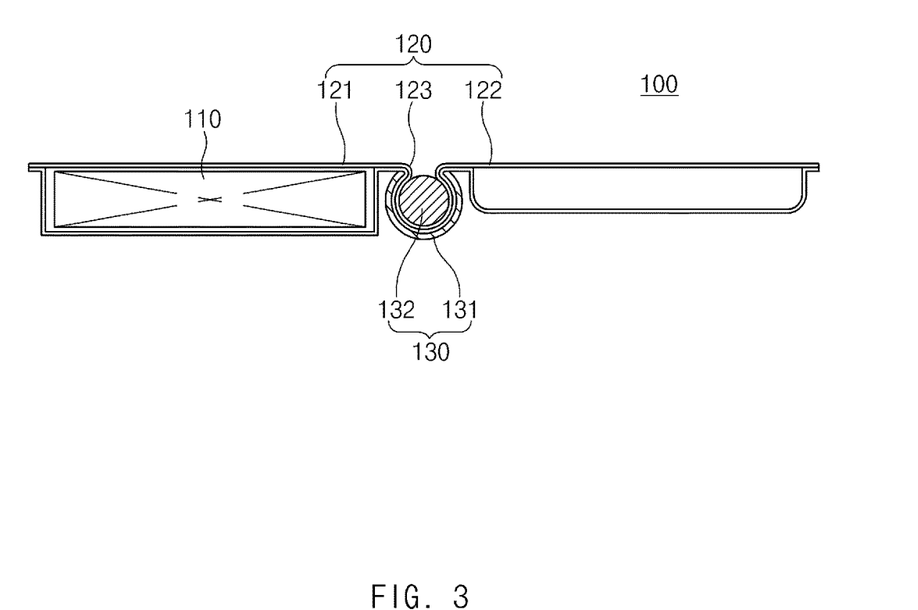
FIG. 3 is a cross-sectional view of the secondary battery according to the present invention.

As illustrated in FIGS. 1 to 3, the clamp device 130 may include a female member 131 and a male member 132, which are respectively disposed on top and bottom surfaces between the accommodation part 121 and the gas pocket part 122 and coupled to each other to press-fit and seal the sealing part 123 between the accommodation part 121 and the gas pocket part 122.

The female member 131 has a rounded shape with a C-shaped cross-section, and the male member 132 has a circular cross-section so that the male member 132 is inserted into the female member 131.

Then, the female member 131 of the clamp device 130 is disposed on the bottom surface of the sealing part 123, and the male member 132 is disposed on the top surface of the sealing part 123 corresponding to the female member 131. Thereafter, the male member 132 is inserted into the female member 131. Here, the sealing part 123 together with the male member 132 is inserted into the female member 131 to allow an outer circumferential surface of the male member 132 and an inner circumferential surface of the male member 131 to press-fit and seal the sealing part 123.

Particularly, the female member 131 has elasticity so that the male member 132 is press-fitted to be surrounded by the female member 131. Thus, the male member 132 is press-fitted into the female member 131 in a state in which the inner circumferential surface of the female member 131 and the inner circumferential surface of the male member 132 come into surface-contact with each other to improve the sealability of the sealing part 123.

The clamp device 130 has a length greater than that of the pouch case 120 in a width direction. Thus, the whole of the pouch case 120 in the width direction may be stably press-fitted into the clamp device 130 to seal the sealing part 123.

Figure 4:
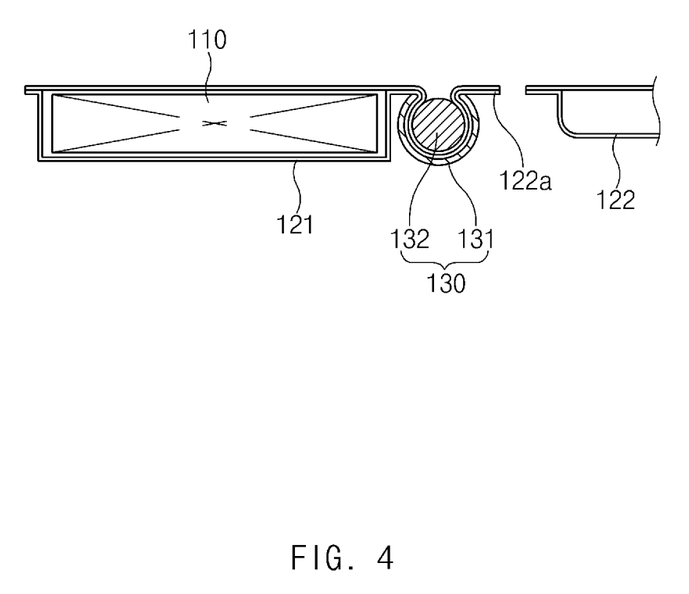
FIG. 4 is a view illustrating a state in which a gas pocket part is cut in the secondary battery according to the present invention.

As illustrated in FIG. 4, the clamp device 130 is coupled to the sealing part 123 between the accommodation part 121 and the gas pocket part 122, and then, the gas pocket part 122 connected to the clamp device 130 is cut and removed in a state in which a clearance surface 122a remains.

That is, the gas pocket part 122 may be configured to collect the gas generated in the accommodation part 121 when the secondary battery is charged and discharged. As a result, when the sealing part 123 is sealed, the gas pocket part 122 may be unnecessary. Thus, when the clamp device 130 is coupled to the sealing part 123, the gas pocket part 122 may be removed to reduce a structure, size, and weight of the secondary battery.

The clearance surface 122a remaining on the clamp device 130 may have a length ranging from about 10.0 mm to about 50.0 mm from the clamp device 130. Particularly, when the leakage occurs after the gas pocket part 122 is removed, the clearance surface 122a may be resealed. For this, the clearance surface 122a has to have at least a length ranging from about 30.0 mm to about 40.0 mm.

Figure 5:
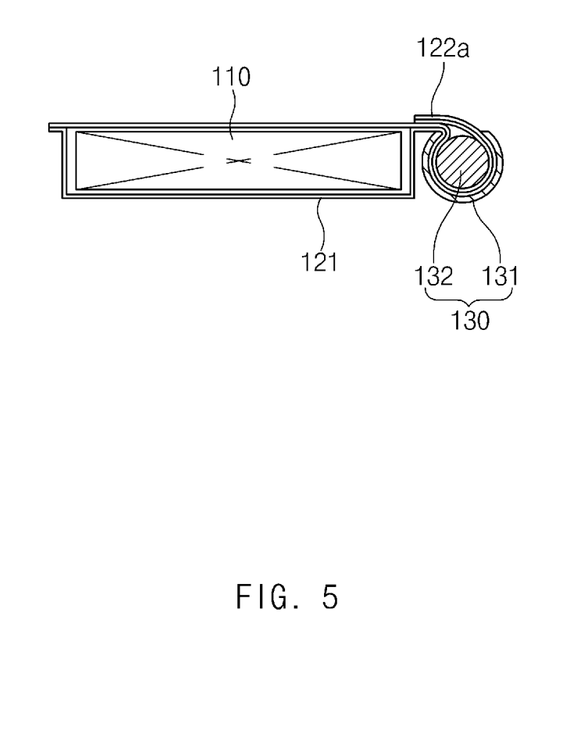
FIG. 5 is a view illustrating a coupled state of a clearance surface remaining after the gas pocket part is cut in the secondary battery according to the present invention.

As illustrated in FIG. 5, the clearance surface 122a may be resealed while being coupled to a surface of the accommodation part 121 by passing through a top surface of the clamp device 130. Thus, the sealability and airtightness of the sealing part 123 may be improved.

Therefore, in the secondary battery 100 according to the present invention, the sealing part 123 between the accommodation part 121 and the gas pocket part 122 may be thermally fused to realize primary sealing, and the clamp device 130 may be coupled to the sealing part 123 to realize secondary sealing. The clearance surface 122a remaining after the gas pocket part 122 is removed may be coupled to the sealing part 123 to realize tertiary sealing, thereby improving the sealability and airtightness of the sealing part 123. Particularly, in the secondary battery 100 according to the present invention, the sealing part 123 may be sealed through the coupling of the clamp device 130 without thermally fusing the sealing part 123. Thus, efficiency in work may be improved.

Hereinafter, a method for manufacturing the secondary battery according to the present invention will be described in detail with reference to the accompanying drawings.

Figure 6:
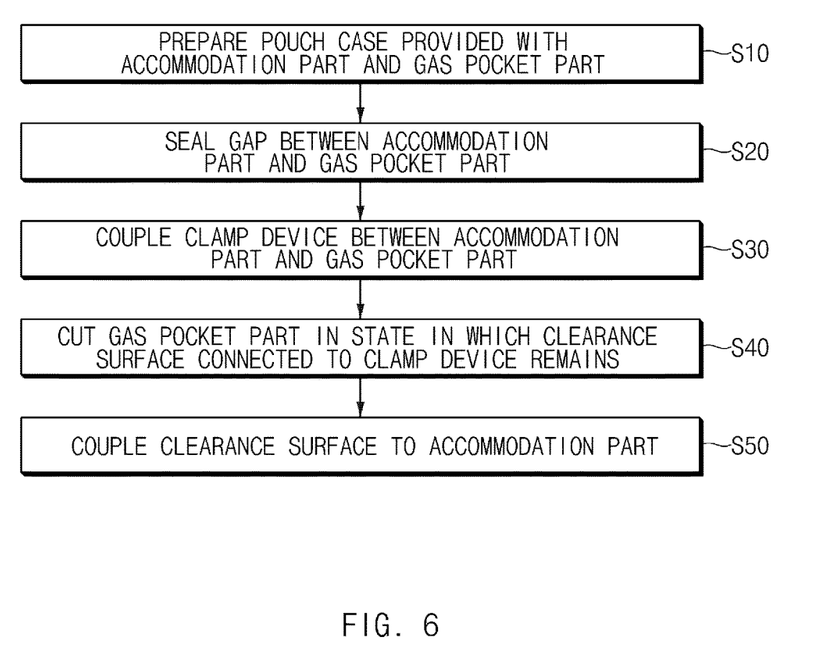
FIG. 6 is a flowchart illustrating a method for manufacturing the secondary battery according to the present invention.

As illustrated in FIG. 6, a method for manufacturing the secondary battery according to the present invention includes a preparing process (S10) of preparing a secondary battery including a pouch case 120 provided with an accommodation part 121 in which an electrode assembly 110 is accommodated and a gas pocket part 122 collecting a gas generated in the accommodation part 121, a sealing process (S20) of thermally fusing and sealing the sealing part 123 between the accommodation part 121 and the gas pocket part 122 of the pouch case 120, a sealing process (S30) of coupling a clamp device to the sealing part 123 to seal the sealing part 123, a removing process (S40) of cutting and removing the gas pocket part 122, and a coupling process (S50) of coupling a clearance surface remaining after the gas pocket part 122 is removed to the accommodation part 121.

Figure 7:
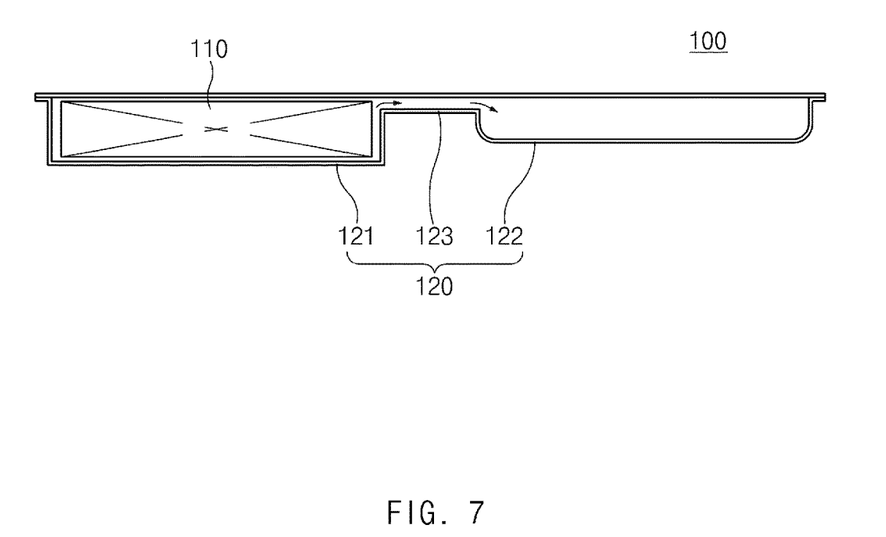
FIG. 7 is a view illustrating a degassed state of the secondary battery according to the present invention.

As illustrated in FIG. 7, in the preparing process (S10), a plurality of electrodes and a plurality of separators are alternately stacked to prepare the electrode assembly 110, and then, the pouch case 120 provided with the accommodation part 121 in which the electrode assembly 110 is accommodated and the gas pocket part 122 collecting the gas generated in the accommodation part 121 is prepared.

The prepared electrode assembly 110 is accommodated in the accommodation part 121 of the pouch case 120, and then, an edge surface of the pouch case 120 is seated to manufacture the secondary battery.

When the secondary battery is manufactured, charging/discharging is performed to improve performance of the secondary battery. Here, while the electrode assembly 110 is charged and discharged, a gas is generated. The gas generated from the electrode assembly 110 is collected into the gas pocket part 122 through the accommodation part 121. Then, when the collection of the gas is finished, the preparing process is completed.

Figure 8:
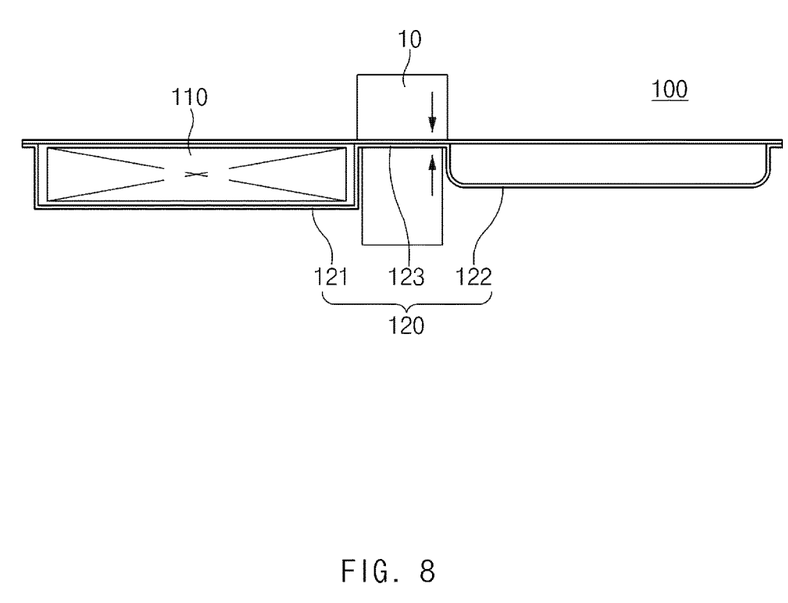
FIG. 8 is a view illustrating a state in which an accommodation and a gas pocket part are sealed therebetween in the secondary battery according to the present invention.

As illustrated in FIG. 8, the sealing process (S20) is performed so that the accommodation part and the gas pocket part are sealed therebetween after the gas is collected. Here, heat and a pressure are applied to top and bottom surfaces of the sealing part 123 connecting the accommodation part 121 to the gas pocket part 122 at the same time to seal the sealing part 123. Thus, the accommodation part 121 and the gas pocket part 122 are primarily sealed therebetween.

Figure 9:
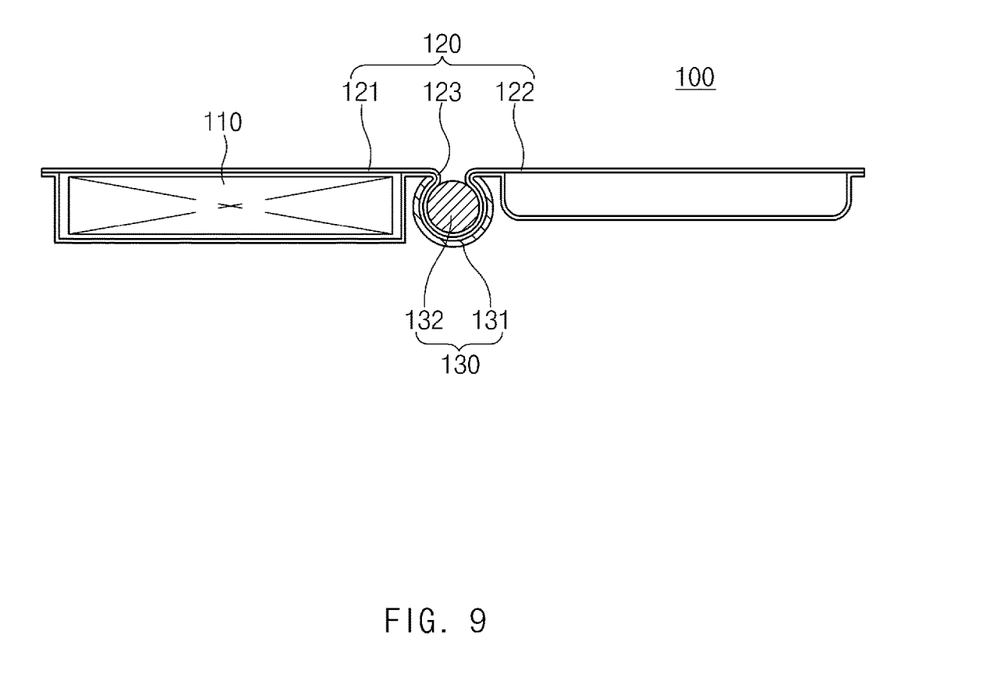
FIG. 9 is a view illustrating a state in which a clamp device is mounted between the accommodation part and the gas pocket part in the secondary battery according to the present invention.

As illustrated in FIG. 9, in the sealing process (S30), the clamp device 130 is coupled to the sealing part 123 that is primarily sealed to secondarily seal the sealing part 123.

That is, the clamp device 130 includes a male member 132 and a female member 131, which are respectively disposed on the top and bottom surfaces of the sealing part 123. The male member 132 and the female member 131 are coupled to each other to press-fit the sealing part 123 between the accommodation part 121 and the gas pocket part 122, thereby secondarily sealing the sealing part 123.

Figure 10:
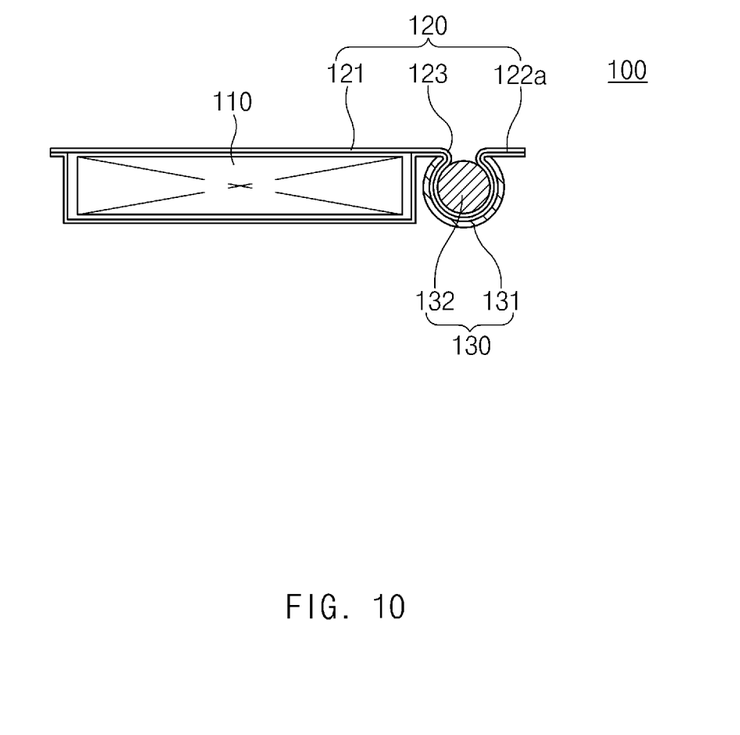
FIG. 10 is a view illustrating a state in which the gas pocket part is cut in the secondary battery according to the present invention.

In the removing process (40), the gas pocket part 122 is cut and removed from the pouch case 120 to which the clamp device 130 is coupled. Here, the gas pocket part 122 is cut in a state in which a clearance surface 122a remains on the clamp device 130. Here, the clearance surface 122a may have a length ranging from about 10.0 mm to about 50.0 mm, particularly, about 30.0 mm outward from the clamp device 130 so that the clamp device 130 is coupled to the accommodation part 121 through the top surface thereof.

Figure 11:
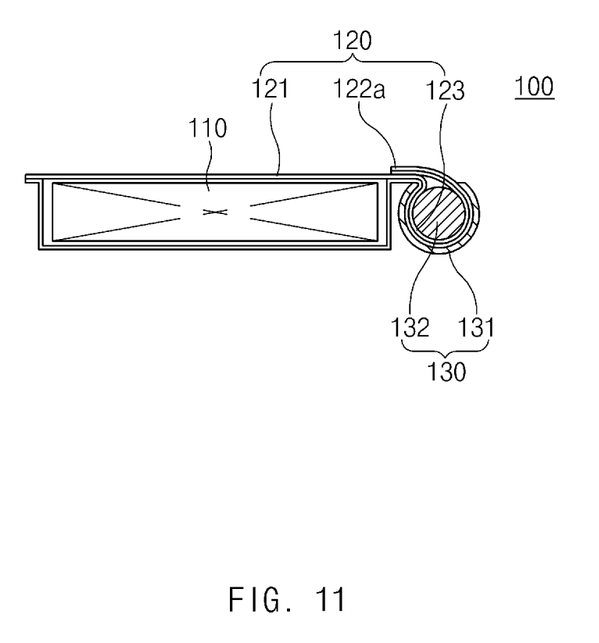
FIG. 11 is a view illustrating a state in which a clearance surface remaining after the gas pocket part is cut is coupled in the secondary battery according to the present invention.

In the coupling process (S50), the clearance surface 122a remaining on the clamp device 130 is closely attached to the surface of the accommodation part 121 through the top surface of the clamp device 130, and then, the heat and pressure are applied to the accommodation part 121 and the clearance surface 122a at the same time, thereby tertiarily sealing the sealing part 123.

Therefore, in the method for manufacturing the secondary battery according to the present invention, the accommodation part 121 and the gas pocket part of the pouch case may be sealed three times to improve the sealability and airtightness.

The present invention has effects as follows.

First: in the secondary battery according to the present invention, the clamp device may be coupled between the accommodation part and the gas pocket part to improve the sealability and airtightness between the accommodation part and the gas pocket part and prevent the electrolyte from leaking and the defects of the products from occurring.

Second: the clamp device according to the present invention may be provided with the female member and the male member to stably seal the gap between the accommodation part and the gas pocket part.

Third: according to the present invention, the female member may have the C shape, and the male member may have the circular shape that is inserted into the female member to increase the press-fit area, thereby improving the sealability and airtightness between the accommodation part and the gas pocket part.

Fourth: in the secondary battery according to the present invention, the accommodation part and the gas pocket part may be thermally fused to each other to realize the primary sealing, and the clamp device may be coupled to realize the secondary sealing, thereby improving the sealability and airtightness between the accommodation part and the gas pocket part.

Fifth: in the secondary battery according to the present invention, when the clamp device is coupled between the accommodation part and the gas pocket part, the gas pocket part may be cut and removed to reduce the size of the secondary battery.

Sixth: in the secondary battery according to the present invention, the gas pocket part may be cut in the state in which the clearance surface remains, and the remaining clearance surface may be coupled to the accommodation part to improve the sealability between the accommodation part and the gas pocket part.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

What is claimed is:

1. A secondary battery comprising:
   a pouch case provided with an accommodation part accommodating an electrode assembly and a gas pocket part collecting a gas generated in the accommodation part by the electrode assembly; and
   a clamp device coupled between the accommodation part and the gas pocket part to seal a gap between the accommodation part and the gas pocket part,
   wherein the clamp device comprises a female member and a male member, which are respectively disposed on top and bottom surfaces between the accommodation part and the gas pocket part and coupled to each other to press the accommodation part and the gas pocket part and seal the gap between the accommodation part and the gas pocket part.

2. The secondary battery of claim 1, wherein the female member has a rounded shape with a C-shaped cross-section, and
   the male member has a circular cross-section that is inserted into the female member.

3. The secondary battery of claim 2, wherein the female member has elasticity so that the male member is press-fitted to be surrounded by the female member.

4. The secondary battery of claim 1, wherein the clamp device has a length greater than that of the pouch case in a width direction.

5. The secondary battery of claim 1, wherein a sealing part for sealing the gap between the accommodation part and the gas pocket part is disposed between the accommodation part and the gas pocket part, and
   the clamp device is coupled to the sealing part.

6. The secondary battery of claim 1, wherein, after the clamp device is coupled between the accommodation part and the gas pocket part, the gas pocket part connected to the clamp device is cut and removed in a state in which a clearance surface remains.

7. The secondary battery of claim 6, wherein the clearance surface has a length ranging from about 10.0 mm to about 50.0 mm.

8. The secondary battery of claim 6, wherein the clearance surface remaining on the clamp device is coupled to a surface of the accommodation part.

* * * * *